United States Patent
Gan et al.

(10) Patent No.: US 12,547,236 B2
(45) Date of Patent: Feb. 10, 2026

(54) WORKLOAD-AWARE VOLTAGE REGULATOR TUNING

(71) Applicant: Google LLC, Mountain View, CA (US)

(72) Inventors: Houle Gan, Santa Clara, CA (US); Shuai Jiang, San Jose, CA (US); Sanjay Nilamboor, Santa Clara, CA (US); Rammohan Padmanabhan, Palo Alto, CA (US); Mohamed Elgebaly, Cupertino, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 17/961,155

(22) Filed: Oct. 6, 2022

(65) Prior Publication Data

US 2024/0118740 A1 Apr. 11, 2024

(51) Int. Cl.
*G06F 1/3296* (2019.01)
*G06F 1/329* (2019.01)
*G06F 9/48* (2006.01)

(52) U.S. Cl.
CPC ............ *G06F 1/3296* (2013.01); *G06F 1/329* (2013.01); *G06F 9/4893* (2013.01)

(58) Field of Classification Search
CPC ....... G06F 1/3296; G06F 1/329; G06F 9/4893
See application file for complete search history.

(56) References Cited

U.S. PATENT DOCUMENTS

| | | | | |
|---|---|---|---|---|
| 6,574,739 B1 * | 6/2003 | Kung | .................. | G06F 1/324 |
| | | | | 713/320 |
| 6,772,356 B1 * | 8/2004 | Qureshi | .................. | G06F 1/324 |
| | | | | 257/E23.179 |
| 7,583,555 B2 * | 9/2009 | Kang | .................. | G06F 1/324 |
| | | | | 365/226 |
| 9,075,614 B2 * | 7/2015 | Fetzer | .................. | G06F 1/3296 |
| 9,166,597 B1 * | 10/2015 | Denisenko | ....... | H03K 19/17728 |
| 9,436,245 B2 * | 9/2016 | Bhandaru | .......... | G06F 1/3206 |
| 9,892,227 B1 * | 2/2018 | Bisht | .................. | G06F 30/33 |
| 2007/0096775 A1 * | 5/2007 | Elgebaly | .............. | G06F 1/3296 |
| | | | | 327/261 |
| 2009/0049314 A1 * | 2/2009 | Taha | .................. | G06F 1/3296 |
| | | | | 713/300 |
| 2010/0083009 A1 * | 4/2010 | Rotem | .................. | G06F 1/3203 |
| | | | | 713/300 |
| 2011/0320838 A1 * | 12/2011 | Jenne | .................. | G06F 1/3203 |
| | | | | 713/320 |

(Continued)

FOREIGN PATENT DOCUMENTS

GB 2511628 A 9/2014

OTHER PUBLICATIONS

Extended European search report for European Appl. No. 23174472.3 dated Feb. 21, 2024. 7 pages.

*Primary Examiner* — Aurel Prifti
(74) *Attorney, Agent, or Firm* — Lerner David LLP

(57) ABSTRACT

A method and system of tuning a voltage regulator including receiving, at a voltage regulator, workload information for a workload to be executed by a processor that receives power from the voltage regulator; setting at least one of a load line value for the voltage regulator, a setpoint voltage supplied by the voltage regulator to the processor, or a phase shedding configuration of the voltage regulator based on the workload information; and sending to the processor, after the setting is complete, an acknowledgement signal indicating that the workload can proceed.

12 Claims, 5 Drawing Sheets

(56) References Cited

U.S. PATENT DOCUMENTS

| | | | |
|---|---|---|---|
| 2014/0032949 A1* | 1/2014 | Kim | G05D 23/1919 |
| | | | 713/322 |
| 2014/0101478 A1* | 4/2014 | Tal | H05K 999/99 |
| | | | 713/600 |
| 2014/0160274 A1* | 6/2014 | Ishida | G03B 37/04 |
| | | | 348/113 |
| 2014/0195829 A1* | 7/2014 | Bhandaru | G06F 1/3206 |
| | | | 713/300 |
| 2015/0089249 A1* | 3/2015 | Hannon | G06F 1/3287 |
| | | | 713/300 |
| 2015/0261270 A1* | 9/2015 | Vikinski | G06F 1/28 |
| | | | 713/300 |
| 2016/0026231 A1* | 1/2016 | Ignowski | G06F 1/3206 |
| | | | 713/320 |
| 2016/0342198 A1* | 11/2016 | Hsu | G06F 1/3296 |
| 2017/0205863 A1 | 7/2017 | Lee et al. | |
| 2017/0364140 A1* | 12/2017 | Banerjee | G06F 1/3206 |
| 2018/0088647 A1* | 3/2018 | Suryanarayanan | G06F 9/46 |
| 2018/0232034 A1* | 8/2018 | DiBene, II | G06F 1/3206 |
| 2019/0041925 A1* | 2/2019 | Ahuja | G06F 1/324 |
| 2021/0064110 A1* | 3/2021 | Gendler | G06F 1/3296 |
| 2021/0116982 A1* | 4/2021 | Khanna | G06F 1/3287 |
| 2021/0132123 A1* | 5/2021 | Mathiyalagan | G06F 1/3296 |
| 2022/0100247 A1* | 3/2022 | Garg | G06F 1/3203 |
| 2022/0113788 A1* | 4/2022 | Kumashikar | G06F 1/3287 |
| 2022/0114316 A1* | 4/2022 | Li | G06F 30/343 |
| 2022/0116042 A1* | 4/2022 | Maheshwari | H03K 19/177 |
| 2022/0236754 A1* | 7/2022 | Dinh | G06F 1/3243 |
| 2022/0320991 A1* | 10/2022 | Radhakrishnan | G01K 7/015 |
| 2022/0335190 A1* | 10/2022 | Chen | G06F 30/343 |
| 2022/0393587 A1* | 12/2022 | Chan | H02M 1/0009 |
| 2023/0079975 A1* | 3/2023 | Saeed | G06N 3/048 |
| | | | 713/320 |
| 2023/0104685 A1* | 4/2023 | Leung | G06F 1/28 |
| | | | 713/320 |
| 2023/0350696 A1* | 11/2023 | Harwani | G06F 1/206 |
| 2024/0045699 A1* | 2/2024 | Tang | G06N 20/00 |
| 2024/0134726 A1* | 4/2024 | Thyagaturu | G06F 9/548 |

* cited by examiner

WORKLOAD-AWARE VOLTAGE REGULATOR TUNING

BACKGROUND

A key component of current computer architectures is the voltage regulator (VR) that supplies power to the processing unit (xPU) of the computer. In many cases, VRs are employed as DC-to-DC converters to supply a desired DC voltage to an xPU. By way of example, multi-phase buck converters are widely used for delivering desired DC voltage to xPUs (e.g., ASICs, application-specific integrated circuits) of data center computers. Often the VRs are used to power xPUs that execute machine learning (ML) tasks. Such xPUs may be referred to as ML chips.

Different workloads running on an ML chip could vary greatly in their power demands. This includes different levels of thermal dissipation power (TDP), which may serve as an indicator of the sustained average current required by the chip while executing a given workload; electrical dissipation power (EDP), which may serve as an indicator of the transient maximum current required by the chip while executing a given workload; idle power, which may serve as an indicator of the current required by the chip when a given workload is either not running, or running but not processing data; and current change rate (di/dt), which indicates the maximum rate at which current required by the chip changes while the chip is executing a given workload. Differences in these aspects among the most common ML workloads in a typical datacenter could be as large as 100%. In the power conversion and delivery design for these ML chips, it is common to design for the worst case workload, and in particular the highest TDP, EDP and di/dt from all possible workloads. The VR is pre-tuned to provide the best performance for this "full load" condition. However, such pre-tuning may not provide the optimal operating point for the vast majority of individual workloads that are consuming less than the full load. As an example, the ML chip could be running at a higher-than-necessary supply voltage for a particular workload that only consumes 70% of worst-case TDP, resulting in excess power consumption that provides no performance benefit.

Three techniques that have been used in an effort to avoid unnecessary power consumption by a voltage regulator supplied ML chip are static voltage scaling (SVS), dynamic voltage and frequency scaling (DVFS), and passive phase shedding. SVS changes the supply voltage of a VR according to the process corner of a chip powered by the VR. SVS takes advantage of silicon process distribution across different chips, but does not consider various workload conditions on the same chip.

DVFS dynamically changes the supply voltage of the VR and the clock frequency of the chip while the chip runs a workload. Typically, only the supply voltage is changed for the VR during this process to accommodate different chip clock frequencies while still meeting the current requirements for the chip as it runs the workload. DVFS is useful when the workload signature is unknown and irregular, so that the chip can provide transient performance boost or power saving very quickly when needed. However, workloads of ML chips are relatively stable and predictable, and do not require frequent DVFS transitions. Further, the transitions themselves introduce additional delays which could impede the performance of ML workloads. In addition, DVFS requires high-speed and complex protocols between the chip and the VR, which increases the costs associated with DVFS-based systems.

Passive phase shedding is a technique according to which a multi-phase VR, selectively turns phases on/off according to a chip's total current consumption, so as to ensure that current per phase is close to optimal. Such a process is passive and reactive, and is based on current demanded by the chip, rather than active or predictive, such as being instructed by the workload before the workload is executed by the chip.

BRIEF SUMMARY

It has been recognized that the power consumed by a computer processing units can be greatly reduced, in a cost efficient manner, by tuning the VRs powering those units according to information about the workloads that will execute on the units. In particular, it has been recognized that by providing a VR with workload-specific power demand information, before the workload is executed by the processor powered by the VR, the VR can be tuned to the workload in a manner that will greatly reduce the power consumed by the processor while executing the workload. In an envisioned application, a VR powering an ASIC of a datacenter is tuned according to information about a workload before the workload is executed by the ASIC.

In view of the desire for reducing the power consumed by VR powered processors, the presently disclosed technology is provided.

In one aspect, the presently disclosed technology provides a method of tuning a voltage regulator including receiving, at a voltage regulator, workload information for a workload to be executed by a processor that receives power from the voltage regulator; setting at least one of a load line value for the voltage regulator, a setpoint voltage supplied by the voltage regulator to the processor, or a phase shedding configuration of the voltage regulator based on the workload information; and sending to the processor, after the setting is complete, an acknowledgement signal indicating that the workload can proceed.

In another aspect the presently disclosed technology provides a computer including a processor; and a voltage regulator for supplying power to the processor and receiving workload information for a workload to be executed by the processor, wherein at least one of a load line value for the voltage regulator, a setpoint voltage supplied by the voltage regulator to the processor, or a phase shedding configuration of the voltage regulator is set based on the workload information, and wherein after at least one of the load line value for the voltage regulator, the setpoint voltage supplied by the voltage regulator to the processor, or the phase shedding configuration of the voltage regulator is set, an acknowledgement signal, indicating that the workload can proceed, is sent to the processor.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

According to the present technology, when a processor powered by a VR is about to execute a workload, the processor supplies information about that workload to the VR so that the VR can be tuned to the workload.

Figure 1:
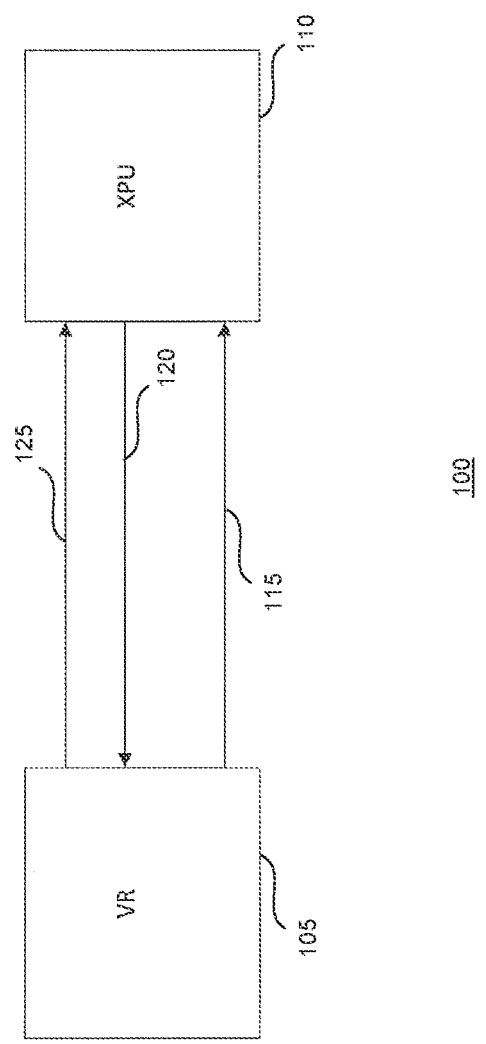
FIG. 1 is a block diagram of a system according to an embodiment.

Turning to FIG. 1, the figure shows a block diagram of a system 100 according to an embodiment. As can be seen from the figure, the system 100 includes a VR 105 (e.g., a DC-to-DC converter) and an xPU 110 (e.g., and ASIC). The VR 105 supplies the xPU 110 with power 115 at a DC supply voltage. When the xPU 110 is to execute a workload (e.g., an ML algorithm), the xPU 110 may send workload information 120 for the workload to be executed to the VR 105. Upon receiving the workload information 120, the VR 105 may then tune itself, according to the workload information 120, to optimize the power consumed by the system 100 during execution of the workload. Once the VR 105 is tuned to the workload, the VR 105 sends an acknowledgment signal 125 to the xPU 110 indicating that execution of the workload may now proceed.

By way of example, the workload information 120 may include at least one of a thermal design point (TDP) for the workload, an electrical design point (EDP) for the workload, a maximum rate of change of current demanded for the workload, or an idle current demanded for the workload. Further, tuning of the VR 105 may include setting at least one of a load line value for the VR 105, a maximum voltage supplied by the VR 105 to the xPU 110, or a phase shedding configuration of the VR 105. A "load line" is defined as the decrease in steady state voltage supplied by a VR to an xPU per unit increase in current drawn from the VR by the xPU. Thus, in the FIG. 1 embodiment, the load line dictates the decrease in voltage supplied by the VR 105 to the xPU 110 per unit increase in current drawn from the VR 105 by the xPU 110. For instance, if the voltage supplied by the VR 105 decreases by 0.1V when the current drawn from the VR 105 increases by 1000 A, then the load line is 0.1V/1000 A, or 0.1 mohm.

Moreover, it is noted that the xPU may receive the workload information 120 from a workload scheduler (not shown). For example, the xPU may be an accelerator that is working together with a host which schedules the workload into the xPU, with the accelerator being either a graphics processing unit (GPU) or a tensor processing unit (TPU), and the host being a central processing unit (CPU) on a separate system connected to one or multiple accelerators.

It is further noted that, in some embodiments, the VR 105 stores configuration files which are optimized for respective ones of expected workload types, selects a configuration file corresponding to a workload based on received workload information 120 for the workload, and tunes itself according to the selected configuration file prior to execution of the workload.

Figure 2:
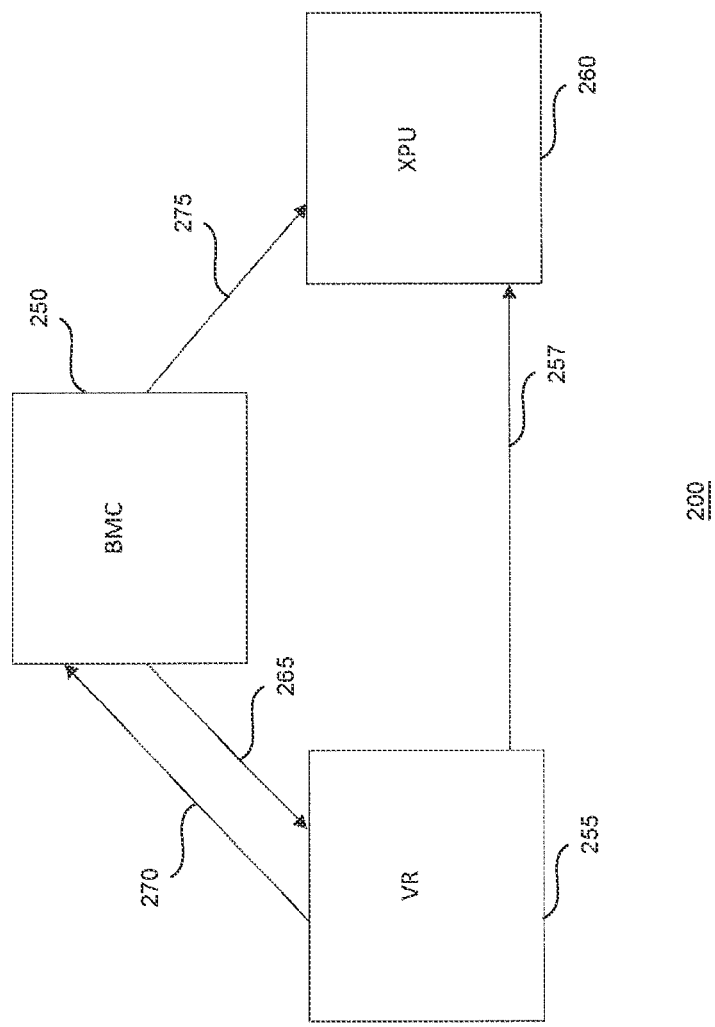
FIG. 2 is a block diagram of a system according to an embodiment that uses a baseboard management controller (BMC).

FIG. 2 is a block diagram of a system 200 according to an embodiment that uses a baseboard management controller (BMC) 250. In the FIG. 2 configuration, a VR 255 (e.g., a DC-to-DC converter) supplies an xPU 260 (e.g., an ASIC) with power 257 at a DC supply voltage, and the BMC 250 is communicatively coupled to the VR 255 and the xPU 260. The BMC 250 supplies workload information 265 to the VR 255, receives a first acknowledgement signal 270 from the VR 260, and sends a second acknowledgment signal 275 to the xPU 260 in response to receiving the first acknowledgment signal 270. When a workload (e.g., an ML algorithm) is to be executed, the BMC 250 may receive workload information concerning the workload from a workload scheduler (not shown), and send to the VR 255 the workload information 265, corresponding to the workload to be executed, by writing dedicated registers inside the VR 255.

Upon receiving the workload information 265, the VR 255 may then tune itself, according to the workload information 265, to optimize for the power consumed by the system 200 during execution of the workload. Once the VR 255 is tuned to the workload, the VR 255 sends the first acknowledgment signal 270 to the BMC 250 indicating that execution of the workload may now proceed. In response to receiving the first acknowledgment signal 270, the BMC 250 sends the second acknowledgement signal 275 to the xPU 260 indicating that execution of the workload may now proceed.

Similar to the case of the FIG. 1 embodiment, in the FIG. 2 embodiment, the workload information 265 may include at least one of a thermal design point (TDP) for the workload, an electrical design point (EDP) for the workload, a maximum rate of change of current demanded for the workload, or an idle current demanded for the workload. Further, tuning of the VR 255 may include setting at least one of a load line value for the VR 255, a maximum voltage supplied by the VR 255 to the xPU 260, or a phase shedding configuration of the VR 255. Also, in some embodiments the VR 255 stores configuration files which are optimized for respective ones of expected workload types, selects a configuration file corresponding to a workload based on received workload information 265 for the workload, and tunes itself according to the selected configuration file prior to execution of the workload.

Figures 3A, 3B, 3C, 3D:
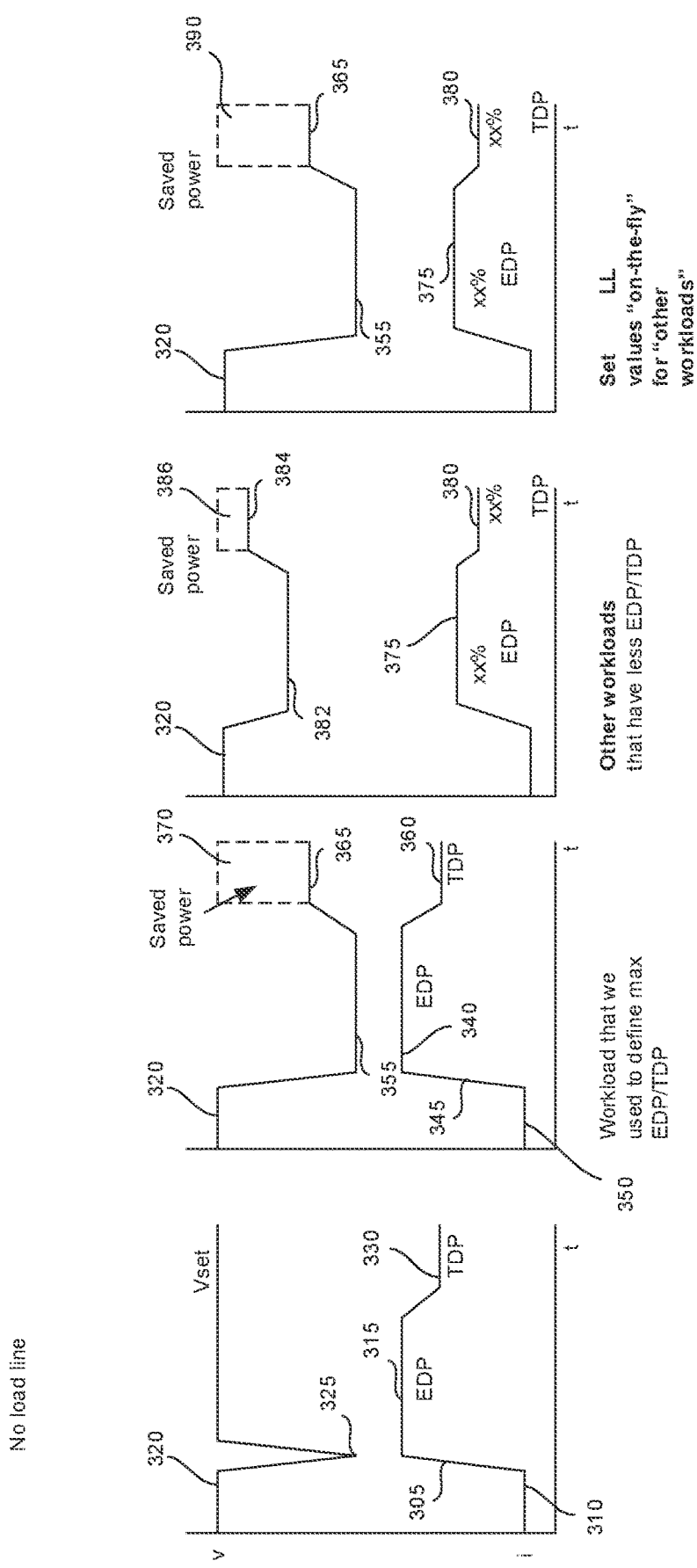
FIGS. 3A-3C are graphs provided for comparison to a similar graph for the presently disclosed technology to aid description of the load line tuning aspects of the technology, each of the graphs of FIGS. 3A-3C showing two plots, voltage versus time for voltage supplied to a processor by a voltage regulator while the processor executes a workload, and current versus time for current demanded by the processor from the voltage regulator while the processor executes a workload.
FIG. 3D is a graph for aiding description of the load line tuning aspects of the presently disclosed technology in view of the graphs of FIGS. 3A-3C, the graph of FIG. 3D showing two plots, voltage versus time for voltage supplied to a processor by a voltage regulator while the processor executes a workload, and current versus time for current demanded by the processor from the voltage regulator while the processor executes a workload.

Turning now to FIGS. 3A-3D, a description is provided for setting the load line value for a voltage regulator based on workload information. FIGS. 3A-3C are graphs provided for comparison to a similar graph for the presently disclosed technology, FIG. 3D, to aid description of the load line tuning aspects of the technology. Each of the graphs of FIGS. 3A-3D shows two plots, voltage versus time for voltage supplied to a processor by a voltage regulator while the processor executes a workload, and current versus time for current demanded by the processor from the voltage regulator while the processor executes a workload.

FIG. 3A shows a case where no load line is employed. As can be seen from the figure, when the workload increases from an idle condition to an EDP condition a current transient 305 occurs, with the current demanded by the processor from the voltage regulator increasing from an idle current 310 to an EDP current 315. The current transient 305 causes the voltage supplied by the voltage regulator to temporarily drop from a setpoint voltage, Vset 320, to Vdroop 325, and the voltage supplied by the voltage regulator is returned to Vset 320, by design, upon detection of the voltage drop caused by the current transient 305. Further, the current demanded by the processor from the voltage regulator generally stabilizes at a TDP current 330 for the remainder of the workload, and thus the power consumed by the workload is nominally Vset times the TDP current 330. To reduce the power consumed by the workload, a load line is implemented.

FIGS. 3B and 3C show supplied voltage and current for a voltage regulator supplying a processor for a fixed load line implementation. In FIGS. 3B and 3C the load line is set according to the highest current that will be demanded by the processor. That is, the load line is set according to a single workload, the workload that causes the highest current demand by the processor. FIG. 3B shows the voltage and current for the workload that causes the highest current demand, with the highest current demand being EDP current 340. As can be seen in FIG. 3B, when a current transient 345 occurs, with the current rising from and idle current 350 to EDP current 340, the voltage drops from the value Vset 320 to a value Vdroop 355, but is maintained at the value Vdroop 355 as long as the current stays at EDP current 340. Thus, the load line in the case of FIG. 3B is (Vset 320–Vdroop 355)/(EDP current 340–idle current 350). Using the load line, when the current drops to TDP current 360, the voltage rises to Vtdp 365, which is lower than Vset 320. Accordingly, in FIG. 3B the nominal power consumed by the workload is Vtdp times the TDP current 360. Therefore, in the case of FIG. 3B, power is saved relative to the no-load line implementation, and is indicated graphically as saved power 370.

However, since the load line of FIGS. 3B and 3C is fixed, the load line is not optimized for workloads other than the workload that causes the highest current demand. In this regard, FIG. 3C is provided. FIG. 3C shows the fixed load line implementation of FIG. 3B as applied to a workload having an EDP current 375 and a TDP current 380, which are less than 100% (i.e., xx %) of the EDP current 340 and TDP current 360. As can be seen from FIG. 3C, since the load line is fixed, when the current rises to EDP current 375 the voltage does not drop from Vset to Vdroop 355, but drops a lesser extent to intermediate EDP voltage 382, and the voltage for TDP current 380 is higher than that for TDP current 360, namely intermediate TDP voltage 384. Thus, in FIG. 3C, a saved power 386 is less than that for FIG. 3B.

By contrast to FIGS. 3A-3C, FIG. 3D concerns implementation of a variable load line. That is, in FIG. 3D the load line is not set according to the workload that causes the highest current demand by the processor, but rather, is set on a workload-by-workload basis. In this manner, the voltage may be set lower for workloads that demand less than 100% of the max demand current, compared to the fixed load line case. By way of example, for the same processor and workloads discussed in connection with FIGS. 3B and 3C, in FIG. 3D when the workload having an EDP current 375 and a TDP current 380 is executed, workload information for such workload is provided to the VR (e.g., as workload information 120 of FIG. 1 or as workload information 265 of FIG. 2), and a greater load line is applied based on the workload information. In FIG. 3D, the greater load line maintains the voltage at Vdroop 355 when the current is EDP current 375, and maintains the voltage at Vtdp 365 when the current is TDP current 380. Accordingly, the power savings of the FIG. 3D implementation, represented by saved power 390, is greater than the power savings of the FIG. 3C implementation, represented by saved power 386.

It should be noted that in some embodiments, the load line may be set on a workload-by-workload basis such that for any given workload the voltage supplied to the processor, for maximum workload current, is the minimum rated voltage (Vmin) for the processor. For instance, in FIG. 3D Vdroop 355 may be Vmin. Also, for some workloads the TDP current may be the maximum workload current, in which case the voltage supplied to the processor may be Vmin when the current demanded by the processor is the TDP current.

It should be further noted that in some embodiments, the workload information (e.g., TDP, EDP, and/or di/dt) may be obtained through post-silicon characterization. In this regard, since most ML ASICs heavily target specific workload categories in which the number of individual workloads are rather limited, the workload information for such ML ASICs, including TDP, EDP and di/dt levels, is easily characterized.

Moreover, it is noted that if a workload launches on an xPU for which pre-characterized workload information is not available, the "full load" workload information may be used to set the load line.

Figures 4A, 4B, 4C, 4D:
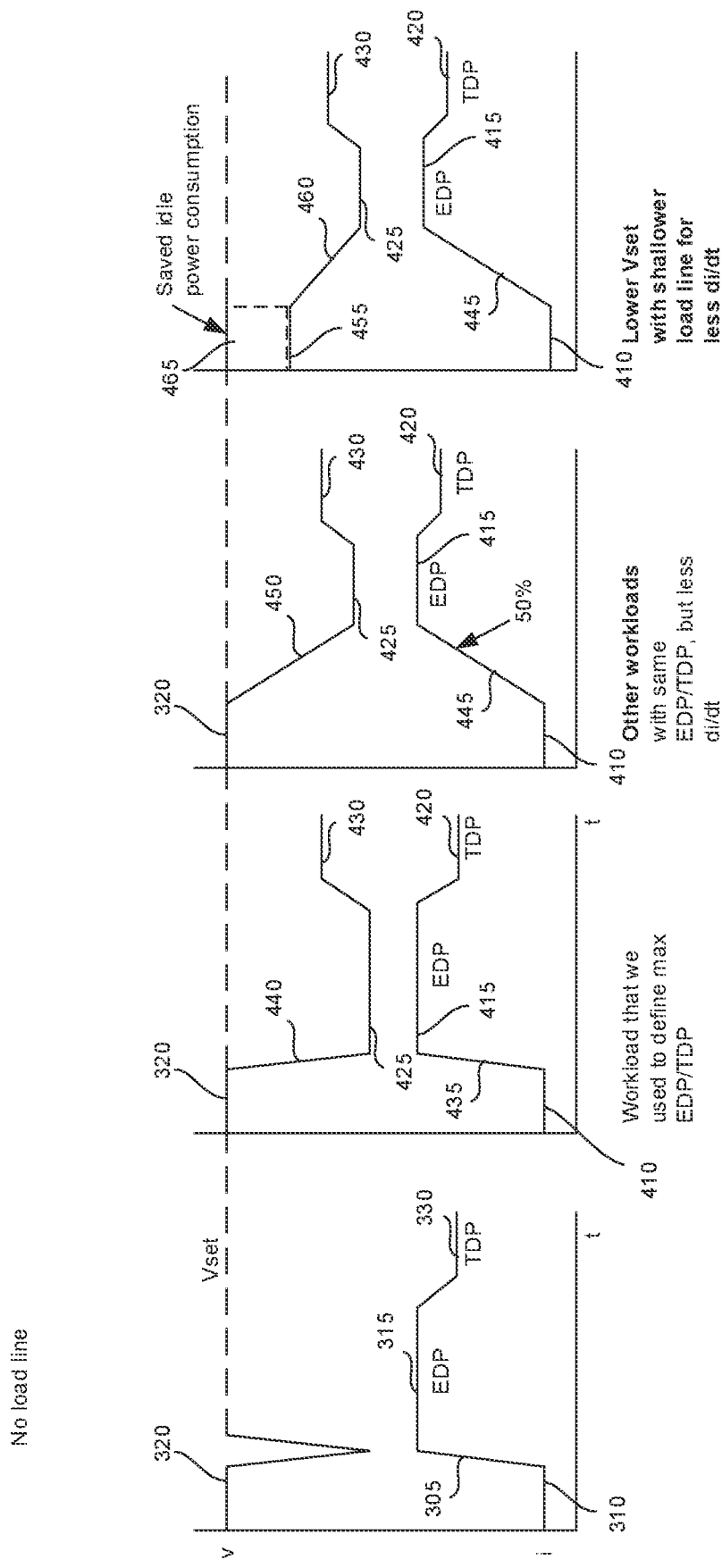
FIGS. 4A-4C are graphs provided for comparison to a similar graph for the presently disclosed technology to aid description of the Vset tuning aspects of the technology, each of the graphs of FIGS. 4A-4C showing two plots, voltage versus time for voltage supplied to a processor by a voltage regulator while the processor executes a workload, and current versus time for current demanded by the processor from the voltage regulator while the processor executes a workload.
FIG. 4D is a graph for aiding description of the Vset tuning aspects of the presently disclosed technology in view of the graphs of FIGS. 4A-4C, the graph of FIG. 4D showing two plots, voltage versus time for voltage supplied to a processor by a voltage regulator while the processor executes a workload, and current versus time for current demanded by the processor from the voltage regulator while the processor executes a workload.

Referring next to 4A-4D, a description is provided for setting a Vset value for a voltage regulator based on workload information. FIGS. 4A-4C are graphs provided for comparison to a similar graph for the presently disclosed technology, FIG. 4D, to aid description of the setpoint (Vset) tuning aspects of the technology. Each of the graphs of FIGS. 4A-4D shows two plots, voltage versus time for voltage supplied to a processor by a voltage regulator while the processor executes a workload, and current versus time for current demanded by the processor from the voltage regulator while the processor executes a workload.

FIG. 4A is identical to FIG. 3A and is provided adjacent FIGS. 4B-4D for ease of reference. As shown in the figure, Vset 320 is the voltage that the voltage regulator supplies to the processor while the workload is in an idle condition such that the processor is drawing idle current 310.

FIG. 4B shows the voltage and current for a workload that demands an idle current 410, an EDP current 415, and a TDP current 420. The figure shows that a load line is implemented such that when the current demand rises from the idle current 410 to the EDP current 415, the voltage supplied from the voltage regulator drops from Vset to Vedp 425. Also, when the current demand decreases from EDP current 415 to TDP current 420, the voltage supplied from the voltage regulator rises from Vedp 425 to Vtdp 430. Notably, the change from idle current 410 to EDP current 415 is a current transient 435 that gives rise to a voltage change 440. The current transient occurs 435 at a current change rate (di/dt), and the amount by which the voltage supplied to the processor temporarily changes in response to the current transient 435 is highly dependent on the current change rate. That is, the current change rate causes the voltage supplied by the VR to experience a voltage transient (not shown), during which the supplied voltage temporarily drops to support the current change rate. To ensure proper functioning of the processor, the voltage supplied by the VR must not be allowed to drop below necessary minimum voltage (Vmin) during the voltage transient.

For a workload with a higher di/dt, a higher voltage transient is expected, and hence a higher starting point for Vset is needed in order to maintain a supply voltage at or above Vmin. However, for a given idle current, a higher Vset results in higher idle power consumption since the idle power consumption is determined by Vset and the idle current. In FIG. 4B, the idle power consumption is Vset 320*idle current 410.

Turing to FIG. 4C, the figure shows the voltage and current for a workload that demands the same idle current 410, EDP current 415, and TDP current 420 as the workload of FIG. 4B, but with a current transient 445 that has a current change rate which is 50% that of the current change rate of the current transient 435. Accordingly, the current transient 445 gives rise to voltage change 450 that has a transient voltage change magnitude (not shown) smaller than that caused by current transient 435. Nevertheless, the voltage would still be changed to Vedp from Vset 320 due to the load line effect. Hence, the idle power consumption in the case of FIG. 4C is the same as the idle power consumption in the case of FIG. 4B, namely Vset 320*idle current 410.

In view of the lower current change rate for the workload of FIG. 4C, it is possible to lower the idle supply voltage Vset for the FIG. 4C workload while still meeting the voltage change rate requirements for the FIG. 4C workload. FIG. 4D depicts the voltage and current for the FIG. 4C workload, but with a reduced Vset, Vset 455, and a reduced load line. As can be seen from FIG. 4D, given the lower current change rate of current transient 445, relative to the current change rate of current transient 435, the reduced Vset 455 may be applied with the reduced load line to realize a voltage change 460 tuned to the workload. Thus, for the workload of FIGS. 4C and 4D, Vset does not need to be set as high as for the workload of FIG. 4B. By reducing Vset for the workload of FIGS. 4C and 4D, relative to the workload for FIG. 4B, rather than leaving Vset the same, a saved idle power consumption 465 is realized.

Figure 5:
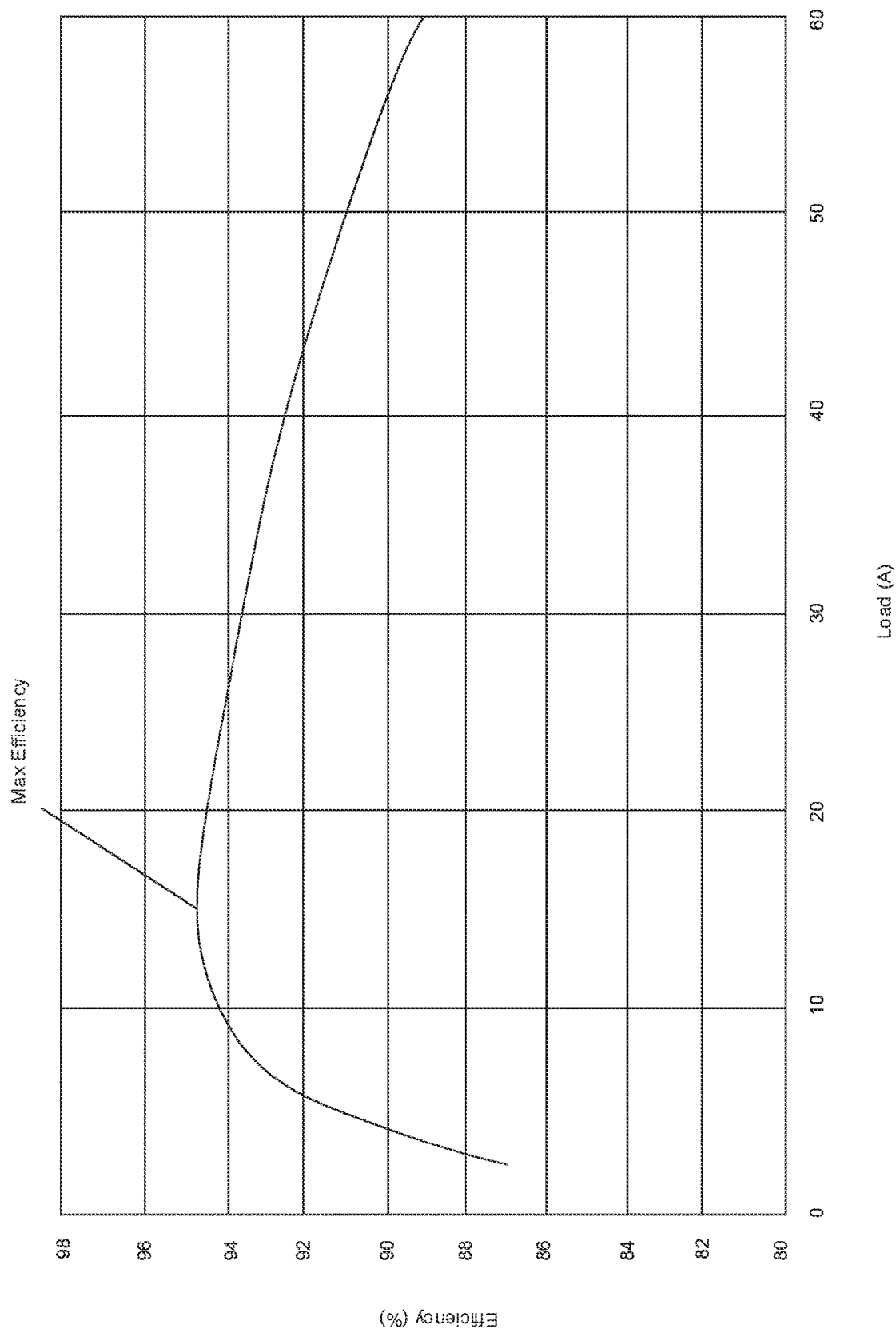
FIG. 5 is a graph for aiding description of the phase shedding aspects of embodiments, the graph of FIG. 5 showing power delivery efficiency versus current supplied for a single stage of a VR operating at a given switching frequency.

Turning now to FIG. 5, the phase shedding aspect of embodiments are described. FIG. 5 is a graph showing power delivery efficiency versus current supplied for a single stage of a VR (e.g., a multi-phase buck converter) operating at a given switching frequency. In the case of the FIG. 5 stage and specified operating frequency, the power delivery efficiency is maximized at about 95% for a current of about 14 A. Therefore, when powering a chip with a VR having multiple stages, each as described in FIG. 5, it is most efficient to activate the number of stages necessary to supply the current demanded by the chip such that each activated stage is delivering as close to 14 A as possible. That is, the phase shedding configuration of the VR should be set such that each activated stage is delivering as close to 14 A as possible. To this end, workload information such as EDP current, TDP current, and idle current may be used by a VR, prior to execution of the workload by the chip, to determine how many stages should be turned on for a given workload. Thereby, ensuring that the VR is operating the maximally efficient number of stages for each workload.

Embodiments of the present technology include, but are not restricted to, the following.

(1) A method of tuning a voltage regulator including receiving, at a voltage regulator, workload information for a workload to be executed by a processor that receives power from the voltage regulator; setting at least one of a load line value for the voltage regulator, a setpoint voltage supplied by the voltage regulator to the processor, or a phase shedding configuration of the voltage regulator based on the workload information; and sending to the processor, after the setting is complete, an acknowledgement signal indicating that the workload can proceed.

(2) The method according to (1), wherein the workload information includes at least one of a thermal design point (TDP) for the workload, an electrical design point (EDP) for the workload, a maximum rate of change of current demanded for the workload, or an idle current demanded for the workload.

(3) The method according to (2), wherein the load line value is set based on the EDP.

(4) The method according to (2), wherein the setpoint voltage supplied by the voltage regulator to the processor is set based on the maximum rate of change of current demanded for the workload.

(5) The method according to (1), wherein the processor is an application-specific integrated circuit (ASIC).

(6) The method according to (1), wherein the workload is a workload associated with a machine learning algorithm.

(7) A computer including a processor; and a voltage regulator for supplying power to the processor and receiving workload information for a workload to be executed by the processor, wherein at least one of a load line value for the voltage regulator, a setpoint voltage supplied by the voltage to the processor, or a phase shedding configuration of the voltage regulator is set based on the workload information, and wherein after at least one of the load line value for the voltage regulator, the setpoint voltage supplied by the voltage regulator to the processor, or the phase shedding configuration of the voltage regulator is set, an acknowledgement signal, indicating that the workload can proceed, is sent to the processor.

(8) The computer according to (7), wherein the workload information includes at least one of a thermal design point (TDP) for the workload, an electrical design point (EDP) for the workload, a maximum rate of change of current demanded for the workload, or an idle current demanded for the workload.

(9) The computer according to (8), wherein the load line value is set based on the EDP.

(10) The computer according to (8), wherein the setpoint voltage supplied by the voltage regulator to the processor is set based on the maximum rate of change of current demanded for the workload.

(11) The computer according to (7), wherein the processor is an application-specific integrated circuit (ASIC).

(12) The computer according to (7), wherein the workload is a workload associated with a machine learning algorithm.

(13) The computer according to (7), wherein the voltage regulator receives the workload information from the processor, and the voltage regulator sends the acknowledgement signal to the processor.

(14) The computer according to (7), further including a baseboard management controller (BMC), and wherein the voltage regulator receives the workload information from the BMC, and the BMC sends the acknowledgement signal to the processor.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method of tuning a voltage regulator comprising:
    receiving, at a voltage regulator, workload information for a workload to be executed by a processor that receives power from the voltage regulator;
    setting, by the voltage regulator, before execution of the workload, at least one of a load line value for the voltage regulator, a setpoint voltage supplied by the voltage regulator to the processor, or a phase shedding configuration of the voltage regulator based on the workload information; and
    sending to the processor, after the setting is complete, an acknowledgement signal indicating that the workload can proceed,
    wherein the setting, by the voltage regulator, is performed on a workload-by-workload basis according to at least one of (i) a maximum rate of change of workload current demanded on a workload-by-workload basis, or (ii) workload idle current on a workload-by-workload basis.

2. The method according to claim 1, wherein the load line value is set based on the EDP.

3. The method according to claim 1, wherein the setpoint voltage supplied by the voltage regulator to the processor is set based on the maximum rate of change of current demanded for the workload.

4. The method according to claim 1, wherein the processor is an application-specific integrated circuit (ASIC).

5. The method according to claim 1, wherein the workload is a workload associated with a machine learning algorithm.

6. A computer comprising:
    a processor; and
    a voltage regulator for supplying power to the processor and receiving workload information for a workload to be executed by the processor,
    wherein at least one of a load line value for the voltage regulator, a setpoint voltage supplied by the voltage to the processor, or a phase shedding configuration of the voltage regulator is set by the voltage regulator, before execution of the workload, based on the workload information received at the voltage regulator,
    wherein after at least one of the load line value for the voltage regulator, the setpoint voltage supplied by the voltage regulator to the processor, or the phase shedding configuration of the voltage regulator is set, an acknowledgement signal, indicating that the workload can proceed, is sent to the processor, and
    wherein the setting, by the voltage regulator, is performed on a workload-by-workload basis according to at least one of (i) a maximum rate of change of workload current demanded on a workload-by-workload basis, or (ii) workload idle current on a workload-by-workload basis.

7. The computer according to claim 6, wherein the load line value is set based on the EDP.

8. The computer according to claim 6, wherein the setpoint voltage supplied by the voltage regulator to the processor is set based on the maximum rate of change of current demanded for the workload.

9. The computer according to claim 6, wherein the processor is an application-specific integrated circuit (ASIC).

10. The computer according to claim 6, wherein the workload is a workload associated with a machine learning algorithm.

11. The computer according to claim 6, wherein the voltage regulator receives the workload information from the processor, and the voltage regulator sends the acknowledgement signal to the processor.

12. The computer according to claim 6, further comprising a baseboard management controller (BMC), and wherein the voltage regulator receives the workload information from the BMC, and the BMC sends the acknowledgement signal to the processor.

* * * * *